US010923242B2

(12) United States Patent
Heibel

(10) Patent No.: US 10,923,242 B2
(45) Date of Patent: Feb. 16, 2021

(54) RADIOISOTOPE PRODUCTION TARGET INSERT DESIGN AND TARGET HARVESTING METHODOLOGY FOR LONG TERM IRRADIATION IN COMMERCIAL NUCLEAR REACTORS

(71) Applicant: Westinghouse Electric Company LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 741 days.

(21) Appl. No.: 15/596,024

(22) Filed: May 16, 2017

(65) Prior Publication Data

US 2018/0336975 A1    Nov. 22, 2018

(51) Int. Cl.
| | |
|---|---|
| *G21G 1/06* | (2006.01) |
| *G21G 1/00* | (2006.01) |
| *G21G 1/02* | (2006.01) |
| *G21C 23/00* | (2006.01) |
| G21C 17/108 | (2006.01) |

(52) U.S. Cl.
CPC ........... *G21G 1/0005* (2013.01); *G21C 23/00* (2013.01); *G21G 1/02* (2013.01); *G21C 17/108* (2013.01)

(58) Field of Classification Search
CPC . G21G 1/00; G21G 1/02; G21C 19/00; G21C 19/02; G21C 19/20
See application file for complete search history.

(56) References Cited

U.S. PATENT DOCUMENTS

| | | |
|---|---|---|
| 3,932,211 A | 1/1976 | Loving, Jr. |
| 7,526,058 B2 | 4/2009 | Fawcett et al. |

(Continued)

FOREIGN PATENT DOCUMENTS

| | | |
|---|---|---|
| JP | 2006162612 A | 6/2006 |
| WO | 2018/029036 A1 | 7/2012 |

OTHER PUBLICATIONS

Westinghouse Electric Company, LLC, U.S. Appl. No. 15/210,231, "Irradiation Target Handling Device," filed Jul. 14, 2016, 16 pages.

(Continued)

*Primary Examiner* — Marshall P O'Connor
(74) *Attorney, Agent, or Firm* — K&L Gates LLP

(57) ABSTRACT

A device and method that enables a specimen that is to be converted into a radioisotope to be inserted into an extended, retractable thimble of a nuclear reactor moveable in-core detector system and be harvested after irradiation either during reactor operation or a refueling outage without damaging the retractable thimble. The specimen is enclosed within the interior of a forward portion of a tubular member having a closed lead end and structured to travel within the retractable thimble. The tubular member is sized to extend from a position above and proximate the desired core elevation the specimen is to be irradiated at to a location above a seal table that the retractable thimble extends through. The specimen is inserted and withdrawn from the core by inserting or withdrawing the tubular member from above the seal table. Desirably, the forward end of the tubular member is divided into several specimen compartments.

13 Claims, 4 Drawing Sheets

(56) References Cited

U.S. PATENT DOCUMENTS

| | | | |
|---|---|---|---|
| 8,681,920 | B2 | 3/2014 | Heibel et al. |
| 8,953,731 | B2 | 2/2015 | Fawcett et al. |
| 9,208,909 | B2 | 12/2015 | Runkle et al. |
| 9,224,507 | B2 | 12/2015 | Heinold et al. |
| 9,239,385 | B2 | 1/2016 | Fawcett et al. |
| 9,305,673 | B2 | 4/2016 | Heinold et al. |
| 9,330,798 | B2 | 5/2016 | Dayal et al. |
| 2011/0051874 | A1 | 3/2011 | Allen et al. |
| 2011/0051875 | A1* | 3/2011 | Bloomquist ........... G21C 19/20 376/202 |
| 2013/0077725 | A1 | 3/2013 | Bloomquist et al. |
| 2013/0315361 | A1 | 11/2013 | Berger et al. |
| 2016/0012928 | A1 | 1/2016 | Guler et al. |

OTHER PUBLICATIONS

Westinghouse Electric Company, LLC, U.S. Appl. No. 15/341,478, "System and Process for Production and Collection of Radioisotopes," filed Nov. 2, 2016, 18 pages.

International Preliminary Report on Patentability for International PCT Application No. PCT/US2018/029036, dated Nov. 19, 2019.

\* cited by examiner

RADIOISOTOPE PRODUCTION TARGET INSERT DESIGN AND TARGET HARVESTING METHODOLOGY FOR LONG TERM IRRADIATION IN COMMERCIAL NUCLEAR REACTORS

BACKGROUND

1. Field

This invention pertains generally to methods and devices for the insertion and removal of radioactive isotopes into and out of a nuclear core and, more particularly, to the insertion and removal of such isotopes that can be harvested during reactor operation or during a refueling outage.

2. Related Art

A number of operating reactors employ a moveable in-core detector system such as the one described in U.S. Pat. No. 3,932,211, to periodically measure the axial and radial power distribution within the core. The moveable detector system generally comprises four, five or six detector/drive assemblies, depending upon the size of the plant (two, three or four loops), which are interconnected in such a fashion that they can assess various combinations of in-core flux thimbles. To obtain the thimble interconnection capability, each detector has associated with it a five-path and ten-path rotary mechanical transfer device. A core map is made by selecting, by way of the transfer devices, particular thimbles through which the detectors are driven. To minimize mapping time, each detector is capable of being run at high speed (72 feet per minute) from its withdrawn position to a point just below the core. At this point, the detector speed is reduced to 12 feet per minute and the detector traversed to the top of the core, direction reversed, and the detector traversed to the bottom of the core. The detector speed is then increased to 72 feet per minute and the detector is moved to its withdrawn position. A new flux thimble is selected for mapping by rotating the transfer devices and the above procedure repeated.

FIG. 1 shows the basic system for the insertion of the movable miniature detectors. Retractable thimbles 10, into which the miniature detectors 12 are driven, take the routes approximately as shown. The thimbles are inserted into the reactor core 14 through conduits extending from the bottom of the reactor vessel 16 through the concrete shield area 18 and then up to a thimble seal table 20. Since the movable detector thimbles are closed at the leading (reactor) end, they are dry inside. The thimbles, thus, serve as a pressure barrier between the reactor water pressure (2500 psig design) and the atmosphere. Mechanical seals between the retractable thimbles and the conduits are provided at the seal table 20. The conduits 22 are essentially extensions of the reactor vessel 16, with the thimbles allowing the insertion of the in-core instrumentation movable miniature detectors. During operation, the thimbles 10 are stationary and will be retracted only under depressurized conditions during refueling or maintenance operations. Withdrawal of a thimble to the bottom of the reactor vessel is also possible if work is required on the vessel internals.

The drive system for insertion of the miniature detectors includes, basically, drive units 24, limit switch assemblies 26, five-path rotary transfer devices 28, 10-path rotary transfer devices 30, and isolation valves 32, as shown. Each drive unit pushes a hollow helical wrap drive cable into the core with a miniature detector attached to the leading end of the cable and a small diameter coaxial cable, which communicates the detector output, threaded through the hollow center back to the trailing end of the drive cable. Each detector has its own drive system.

The use of the moveable in-core detector system flux thimbles 10 for the production of irradiation desired neutron activation and transmutation products, such as isotopes used in medical procedures, requires a means to insert and withdraw the material to be irradiated from inside the flux thimbles located in the reactor core 14. Preferably, the means used minimizes the potential for radiation exposure to personnel during the production process and also minimizes the amount of radioactive waste generated during this process. In order to precisely monitor the neutron exposure received by the target material to ensure the amount of activation or transmutation product being produced is adequate, it is necessary for the device to allow an indication of neutron flux in the vicinity of the target material to be continuously measured. Ideally, the means used would be compatible with systems currently used to insert and withdraw sensors within the core of commercial nuclear reactors. Co-pending U.S. patent application Ser. No. 15/210,231, entitled Irradiation Target Handling Device, filed Jul. 14, 2016, describes an Isotope Production Cable Assembly that satisfies all the important considerations described above for the production of medical isotopes that need core exposure for less than a full fuel cycle.

There are other commercially valuable radioisotopes that are produced via neutron transmutation that require multiple neutron induced transmutation reactions to occur in order to produce the desired radioisotope product, or are derived from materials having a very low neutron interaction cross section, such as Co-60, W-188, Ni-63, Bi-213 and Ac-225. These isotopes require a core residence time of a fuel cycle or more. Commercial power reactors have an abundance of neutrons that do not significantly contribute to the heat output from the reactor used to generate electrical power. This invention has as an objective and describes a process and associated hardware that may be used to utilize the neutron environment in a commercial nuclear reactor to produce commercially valuable quantities of radioisotopes that require either short term or long-term neutron exposure and either harvesting during reactor operation or during a refueling outage, with minimal impact on reactor operations and operating costs.

SUMMARY

This invention achieves the foregoing objective by providing a method of irradiating an isotope in a commercial nuclear reactor that has a moveable in-core detector system including detectors that travel in retractable thimbles that extend from a seal table, outside the nuclear reactor, up into a pressure vessel of the nuclear reactor and through instrument thimbles within fuel assemblies supported within a reactor core. The moveable in-core detector system further includes a multi-path selector, positioned on an upstream side of the seal table that selects the retractable thimbles through which the detectors travel. The method comprises the step of providing an elongated, hollow, target specimen cable sized to travel in one of the retractable thimbles with the target specimen cable being sealed at a lead end and having a removable plug that is configured to fit into a trailing end. The target specimen cable has a length sufficient to extend out of the seal table when the target specimen is fully inserted in a preselected, substantially fully extended retractable thimble. The method loads one or more target specimens through the trailing end into a forward location in the hollow of the target specimen cable; closes off the trailing end with the removable plug; and identifies the preselected retractable thimble that extends into the instrument thimble into which the target specimen cable is to be loaded. The method then inserts the lead end of the target specimen cable into the preselected retractable thimble; drives the target specimen cable through the retractable thimble and into the instrument thimble to an elevation that places the target specimen at a predetermined elevation; and irradiates the target specimen at the predetermined elevation for a preselected period of time. After that step the method withdraws the target specimen cable from the instrument thimble after the preselected period of time and out of the preselected retractable thimble to a processing area where it can be loaded into a shielded transportation cask.

In one embodiment the driving step or the driving and withdrawing step is performed manually. Preferably, the inserting step is performed downstream of the multi-path selector and upstream of the seal table. In another embodiment, the driving step comprises inserting the target specimen cable through the retractable thimble into the instrument thimble until the lead end of the target specimen cable reaches the sealed end of the retractable thimble causing the inserting step to cease, then withdrawing the target specimen cable to an axial elevation that places the target specimen at the predetermined elevation. Preferably, after the driving step the method includes the step of sealing an outside of the target specimen cable to the seal table with a compression fitting to lock the target specimen cable in place. In the latter case, in one preferred embodiment the method removes any excess material from the target specimen cable that extends approximately more than three inches above the compression fitting. Then the method inserts the removable plug into the trailing end of the target specimen cable. Preferably, the withdrawing step includes the steps of: releasing the compression fitting; attaching temporary tubing to the preselected retractable thimble above the seal table; and extending the temporary tubing to a staging area where the target specimen cable can be offloaded. Preferably, the method also includes the steps of: winding the target specimen cable that is offloaded into a coiled specimen cable, and loading the coiled specimen cable into a transportation cask. Alternately, in the latter case, the step of winding the target specimen cable includes the step of winding the target specimen cable around a spindle and cutting the target specimen cable in segments. In such a case, the separate segments may be wound around different spindles. The method may also include the steps of partitioning the target specimen cable into different axial compartments and loading different target specimens in at least some of the compartments.

The invention also contemplates a target specimen cable structured to be inserted into a retractable thimble of a moveable in-core detector system that extends from a seal table up into an instrument thimble of a nuclear fuel assembly within a reactor core. The target specimen cable includes an elongated, hollow tubular member having a sealed closed leading end, the tubular member being flexible enough to negotiate bends in the retractable thimble and strong enough not to collapse on itself as it is pushed through the retractable thimble; and a removable end plug configured to close off a trailing end of the tubular member. In one such embodiment, a forward interior of the tubular member is sectioned off into several axial compartments for housing different specimens at different elevations within the reactor core when the target specimen cable is inserted into the instrument thimble.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
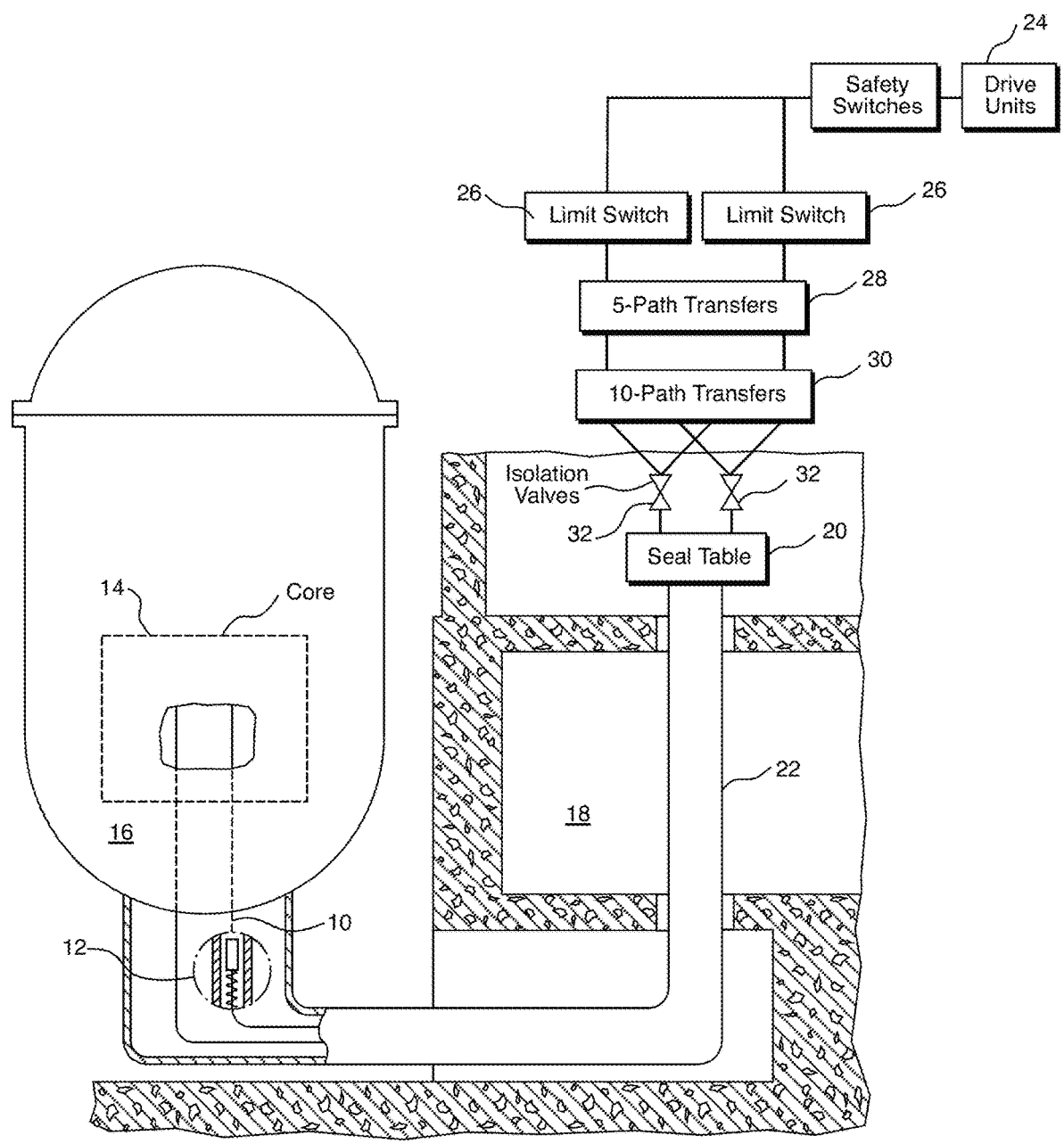
FIG. 1 is a perspective view of a prior art in-core moveable detector arrangement that can be employed with this invention.
Figure 2:
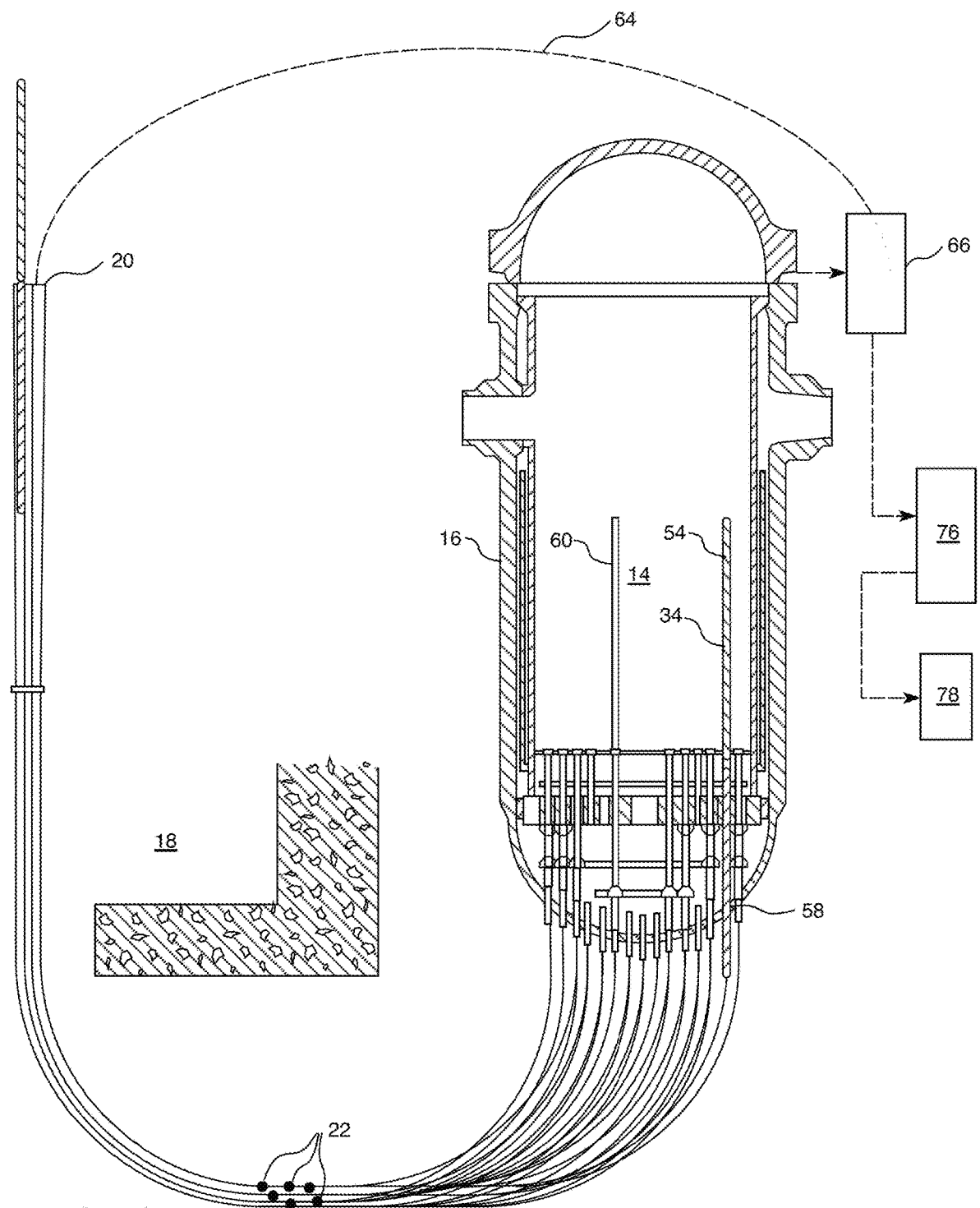
FIG. 2 is a schematic view of a reactor vessel and moveable in-core detector drive system showing the target flux thimble insertion position.

One preferred embodiment of the radioisotope production apparatus and process of this invention utilizes the retractable flux thimbles, that provide the access conduit for the existing movable in-core detector fission chambers to the instrument thimble in the fuel assembly to periodically measure the reactor power distribution, to insert the target material to be transmuted into a desired radioisotope, into the fuel assembly instrument thimble that is predetermined to be the host location during irradiation. The flux thimble containing the target material, hereafter referred to as the target retractable flux thimble 34, is shown schematically in FIG. 2 and takes the place of the miniature detector 12 shown in FIG. 1 as being inserted into the fuel assembly instrument thimble 60. By "takes the place of the miniature detector" it is meant that while the target specimen occupies the target retractable flux thimble 34, the detector cannot transverse the target retractable flux thimble. The thimbles are designated as retractable because when the reactor is in operation the flux thimbles 34, closed at their lead ends, are fully inserted in the corresponding fuel assembly instrument thimble within the core (as figuratively illustrated by reference character 54 in FIG. 2) and during a refueling outage they are retracted from the instrument thimbles to a level below the core (figuratively illustrated by reference character 58 in FIG. 2). The instrument thimbles are figuratively illustrated by the double lines 60.

Figure 3:
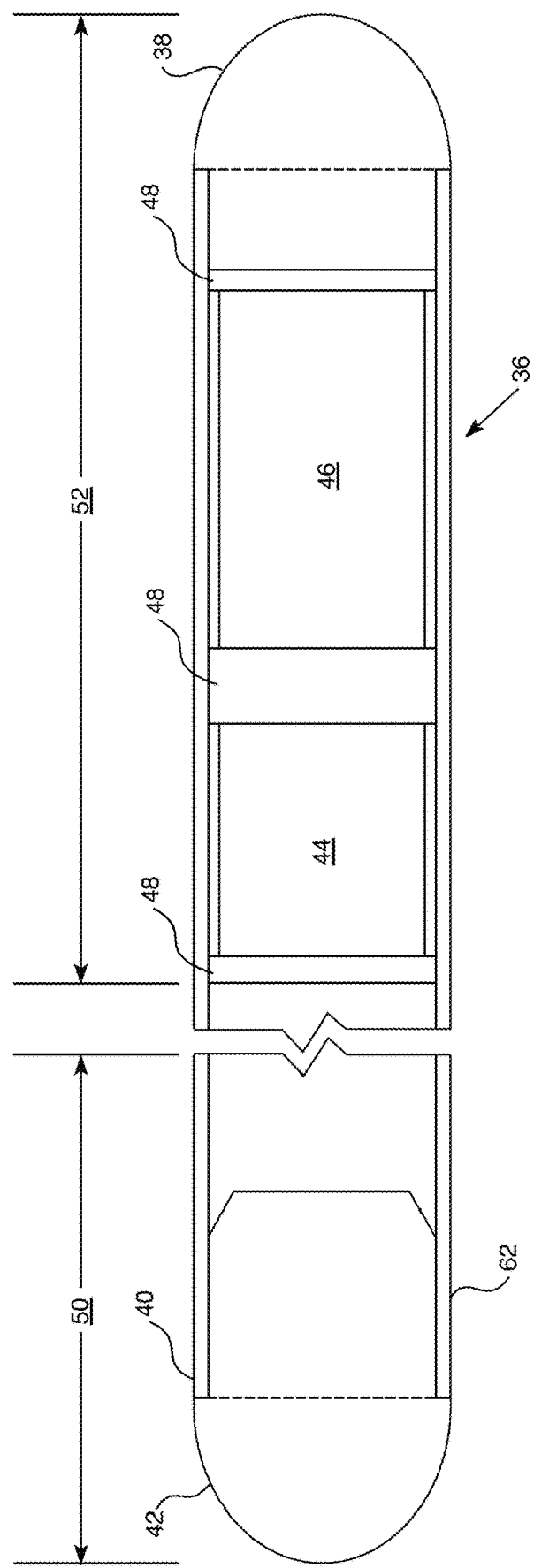
FIG. 3 is a schematic cross-sectional view of the target specimen cable of this invention.

To deliver the target specimen within the target retractable flux thimble this invention employs an elongated, hollow, tubular member or cable 36, shown in FIG. 3, that is closed at its lead end 38, preferably with a bullet nose to ease its entry into the target retractable flux thimble 34. The trailing end 40 of the cable 36 has a removable seal table, preferably bullet nose plug that is inserted into the trailing end 40 of the cable 36 to seal off the opening in the trailing end of the cable after the target specimen(s) have been loaded. The interior portion of the cable 36 that is to be loaded into the fuel assembly instrument thimble may be partitioned off by spacers 48 to form one or more specimen compartments as identified in FIG. 3 by reference characters 44 and 46 and more fully described in co-pending application Ser. No. 15/341,478 (WEC-FY2016-010), filed Nov. 2, 2016. The cable 36, preferably, has a length that extends from the top of the instrument thimble 60 to slightly above the seal table 20 and is functionally divided into a payload positioning region 50 and payload active fuel region 52.

The cable 36, shown in FIG. 3, has a diameter that allows it to be easily inserted into the selected target retractable flux thimble and long enough to ensure that the payload(s) containing the material(s) to be irradiated can be placed at the proper axial position within the corresponding fuel assembly instrument thimble. At any time after the retractable flux thimbles are inserted into their operating positions, the cable 36 containing the target material(s) may be manually inserted into the selected target retractable flux thimble until reaching the end of the thimble causes the insertion to cease. The cable assembly 36 may then be withdrawn as needed to place the axial region of the cable containing the target material(s) in the desired axial position(s) inside the fuel assembly instrument thimble at the selected radial core position. Any excess cable more than approximately three inches above the selected thimble tube compression fitting is removed and the bullet nose removable plug 42 is inserted into the open end of the cable 36. The cable 36 is then locked in place below the moveable in-core detector system 10-path selector 30 using a compression fitting that joins the outer sheath of the cable to the point 62, indicated on FIG. 3, on the cable 36. The compression fitting remains in place until the target specimen reaches the optimum neutron exposure levels.

Figure 4:
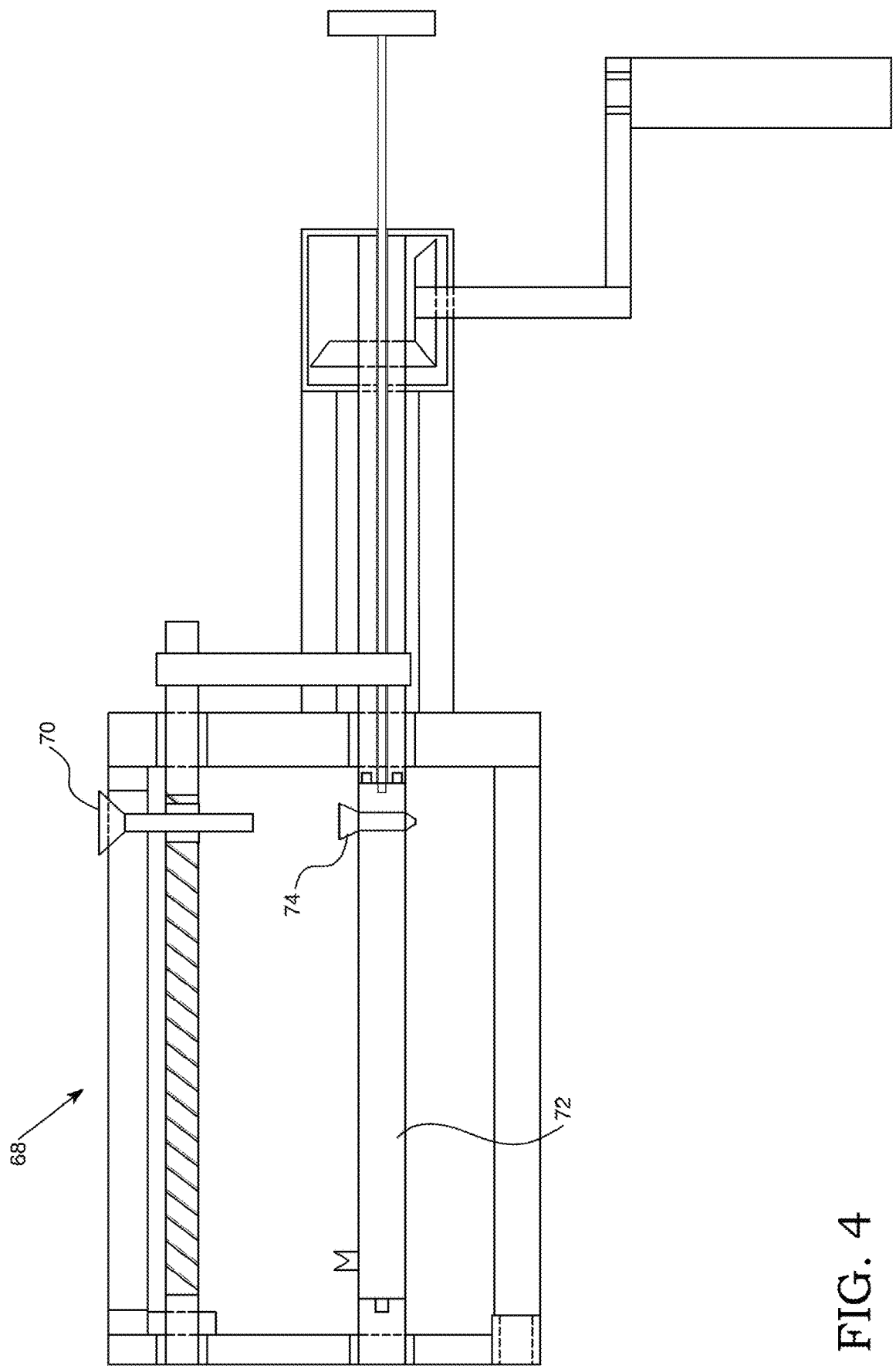
FIG. 4 is a schematic cross-sectional view of a coiling machine that can be used with this invention to compact the target specimen cable for shipment to a processing facility.

Once the target has obtained the optimum neutron exposure, either during a refueling outage or normal operation, temporary guide tubing 64 is installed over the conduit of the target retractable flux tubing and extended from the selected seal table 20 position to a location 66 of a coiling device 68, like that described in co-pending U.S. patent application, entitled Packaging Device for Radioactive Isotopes Produced in Flexible Elongated Shapes Ser. No. 15/596,002, (WEC-FY2016-013) filed concurrently herewith and shown on FIG. 4, which compacts the cable for shipment to a processing facility. The compression fitting on the target cable is removed and the target cable located above the compression fitting point is inserted through the temporary guide tube 64 from the seal table 20 to the coiling device 68. The cable 36 insertion through the guide tube 64 continues until the cable is inserted through the coiling device input funnel 70, locked in place in the device spindle 72 where indicated on FIG. 4 by reference character 74, and wound onto the target spindle as indicated. The device is operated until there is a known length of between 20 and 25 feet of cable remaining inserted in the target retractable flux thimble tube 34. The cable 36 is then cut at the input funnel 70 of the device. The device is positioned to allow it to be opened to remove the spindle containing the cable collected and the spindle and collected cable are stored. A new target cable spindle 72 is installed and the device is positioned as needed. The end of the inserted portion of the target cable 36 is then inserted into the device input funnel 70 until it is locked into place on the spindle. The device is again operated until the remaining portion of the target cable 36 is wound on the target spindle 72 and both spindles can be lowered into the payload cavity of the transfer cask 76 used to remove the produced radioisotope(s) from containment and transfer it to the processing facility 78.

As mentioned above, the target cable 36 may be partitioned into two or more axial regions 44, 46 containing different target materials to allow the simultaneous production of multiple radioisotopes. The ability of the coiling device 68 to enable the device 68 to remotely cut the cable, input and coil the target cable 36 at the coiling device input funnel 70, and deposit the target coils into one or more transfer casks 76 provides the flexibility to satisfy numerous radioisotope production demands to different customers simultaneously.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of irradiating an isotope in a commercial nuclear reactor that has a moveable in-core detector system including detectors that travel in retractable thimbles that extend from a seal table, outside the nuclear reactor, up into a pressure vessel of the nuclear reactor and through instrument thimbles within fuel assemblies supported within a reactor core, the moveable in-core detector system further including a multi-path selector, positioned on an upstream side of the seal table, that selects the retractable thimbles through which the detectors travel, the method comprising the steps of:

providing an elongated, hollow, target specimen cable sized to travel in one of the retractable thimbles with the target specimen cable being sealed at a lead end and having a removable plug that is configured to fit into a trailing end, the target specimen cable having a length sufficient to extend out of the seal table when the target specimen is fully inserted in a preselected, substantially fully extended retractable thimble;

loading one or more target specimens through the trailing end into a forward location in the hollow of the target specimen cable;

closing off the trailing end with the removable plug;

identifying the preselected retractable thimble that extends into the instrument thimble into which the target specimen cable is to be loaded;

inserting the lead end of the target specimen cable into the preselected retractable thimble;

driving the target specimen cable through the retractable thimble and into the instrument thimble to an elevation that places the target specimen at a predetermined elevation;

irradiating the target specimen at the predetermined elevation for a preselected period of time; and withdrawing the target specimen cable from the instrument thimble after the preselected period of time and out of the preselected retractable thimble to a processing area where it can be loaded into a shielded transportation cask.

2. The method of claim 1 wherein the driving step is performed manually.

3. The method of claim 2 wherein the withdrawing step is performed manually.

4. The method of claim 1 wherein the inserting step is performed downstream of the multi-path selector and upstream of the seal table.

5. The method of claim 1 wherein the driving step comprises inserting the target specimen cable through the retractable thimble into the instrument thimble until the lead end of the target specimen cable reaches the sealed end of the retractable thimble causes the inserting step to cease, then withdrawing the target specimen cable to an axial elevation that places the target specimen at the predetermined elevation.

6. The method of claim 1 including the steps of partitioning the target specimen cable into different axial compartments and loading different target specimens in at least some of the compartments.

7. A method of irradiating an isotope in a commercial nuclear reactor that has a moveable in-core detector system including detectors that travel in retractable thimbles that extend from a seal table, outside the nuclear reactor, up into a pressure vessel of the nuclear reactor and through instrument thimbles within fuel assemblies supported within a reactor core, the moveable in-core detector system further including a multi-path selector, positioned on an upstream side of the seal table, that selects the retractable thimbles through which the detectors travel, the method comprising the steps of:

providing an elongated, hollow, target specimen cable sized to travel in one of the retractable thimbles with the target specimen cable being sealed at a lead end and having a removable plug that is configured to fit into a trailing end, the target specimen cable having a length sufficient to extend out of the seal table when the target specimen is fully inserted in a preselected, substantially fully extended retractable thimble;

loading one or more target specimens through the trailing end into a forward location in the hollow of the target specimen cable;

closing off the trailing end with the removable plug;

identifying the preselected retractable thimble that extends into the instrument thimble into which the target specimen cable is to be loaded;

inserting the lead end of the target specimen cable into the preselected retractable thimble;

driving the target specimen cable through the retractable thimble and into the instrument thimble to an elevation that places the target specimen at a predetermined elevation;

sealing an outside of the target specimen cable to the seal table with a compression fitting to lock the target specimen cable in place;

irradiating the target specimen at the predetermined elevation for a preselected period of time; and withdrawing the target specimen cable from the instrument thimble after the preselected period of time and out of the preselected retractable thimble to a processing area where it can be loaded into a shielded transportation cask.

8. The method of claim 7 including the step of removing any excess material from the target specimen cable that extends approximately more than three inches above the compression fitting.

9. The method of claim 8 including the step of inserting the removable plug into the trailing end of the target specimen cable.

10. The method of claim 8 wherein the withdrawing step includes the steps of: releasing the compression fitting; attaching temporary tubing to the preselected retractable thimble above the seal table; and extending the temporary tubing to a staging area where the target specimen cable can be offloaded.

11. The method of claim 10 including the steps of: winding the target specimen cable that is offloaded into a coiled specimen cable; and loading the coiled target specimen cable into a transportation cask.

12. The method of claim 11 wherein the step of winding the target specimen cable includes the step of winding the target specimen cable around a spindle; and cutting the target specimen cable in segments.

13. The method of claim 12 wherein separate segments are wound around different spindles.

* * * * *